United States Patent [19]

Paz-Pujalt et al.

[11] Patent Number: 5,399,499
[45] Date of Patent: Mar. 21, 1995

[54] METHOD OF USING MULTIWAVELENGTH UPCONVERSION FOR SAMPLE ELEMENT INTERROGATION IN MEDICAL DIAGNOSTIC EQUIPMENT

[75] Inventors: Gustavo R. Paz-Pujalt; Charles R. Moon; James M. Chwalek; David D. Tuschel; Dilip K. Chatterjee, all of Rochester, N.Y.

[73] Assignee: Eastman Kodak Company, Rochester, N.Y.

[21] Appl. No.: 242,482

[22] Filed: May 13, 1994

[51] Int. Cl.6 .................... G01N 21/25; G01N 21/31
[52] U.S. Cl. .................... 436/165; 436/171; 436/805; 435/808; 250/581; 250/504 R; 372/41; 372/70
[58] Field of Search .......... 436/164, 165, 171, 172, 436/805; 435/808; 372/69, 41, 75, 20, 23, 70, 39, 92, 99; 250/581, 341, 363.01, 365, 504 R

[56] References Cited

U.S. PATENT DOCUMENTS

| | | | |
|---|---|---|---|
| 4,705,952 | 11/1987 | Limdmayer | 250/484.1 |
| 4,857,228 | 8/1989 | Kabay et al. | 252/301.4 |
| 5,008,890 | 4/1991 | McFarlane | 372/41 |
| 5,245,623 | 9/1993 | McFarlane | 372/69 |

Primary Examiner—David A. Redding
Attorney, Agent, or Firm—Raymond L. Owens

[57] ABSTRACT

Disclosed is a source of visible and ultraviolet radiation that provides a focused beam for performing chemical analysis of a test element having a biological fluid deposited thereon.

5 Claims, 5 Drawing Sheets

METHOD OF USING MULTIWAVELENGTH UPCONVERSION FOR SAMPLE ELEMENT INTERROGATION IN MEDICAL DIAGNOSTIC EQUIPMENT

CROSS REFERENCE TO RELATED APPLICATIONS

Reference is made to commonly assigned U.S. Ser. No. 186,400, filed Jan. 25, 1994, entitled "Device Converting Invisible and Visible Radiation to Visible Light and/or UV Radiation", of Gustavo R. Paz-Pujalt et al, and U.S. Ser. No. 242,487, filed concurrently herewith, entitled "Test Element For Optically Testing Biological Fluids in Clinical Diagnostic Applications" by Paz-Pujalt et al, the disclosures of which are incorporated herein by reference.

FIELD OF INVENTION

The present invention relates to methods of optically testing biological fluids for clinical diagnostic applications.

BACKGROUND OF THE INVENTION

Chemical analysis of a test sample often involves the use of UV/visible radiation from 300 nm to 700 nm, to determine quantitatively the composition of biological fluids like serum. Reflectance or transmission density, or fluorescence measurements of the test element, can be used to calculate chemical concentrations thereby providing a more complete picture of a patient's condition.

In dry chemistry (as used herein, "dry chemistry" refers to tests wherein there are no liquid reagents stored for use, such tests being possible by test elements of the type described in U.S. Pat. No. 3,992,158, Nov. 16, 1976) blood analysis, a sample of blood serum, is added to a test element containing chemical reagents. After sufficient incubation time, a color change or fluorescence is detected by a radiometer. The following is a typical example of a colorimetric test for albumin:

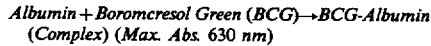

*Albumin + Boromcresol Green (BCG)→BCG-Albumin
(Complex) (Max. Abs. 630 nm)* where the BCG-Albumin complex, formed upon the interaction of albumin with the indicator bromocresol green (BCG), absorbs radiation and the absorption maximum is at 630 nm. The degree of radiation absorption can be monitored as a measure of the albumin concentration. The trend in this industry is toward smaller more compact instruments such that their use could be extended to smaller institutions and individual practices.

The prior art includes several types of light sources that can be used for making measurements in the 300 nm to 700 nm range such as tungsten halogen and pulsed xenon lamps. FIG. 10 shows a schematic of a typical arrangement for this type of measurement with the exception that, in the prior art, a tungsten lamp and cold mirror are used. In the present invention an upconversion light source is used which will be described later. Some of the problems associated with the prior art tungsten radiation sources are: their relatively low stability; short life; size; lack of compactness; and ruggedness. Furthermore, tungsten halogen lamps have relatively short lives, generate excessive heat, and have a low ratio of usable light to power in the UV-blue region of the spectrum. In addition, the output power or intensity decreases with time and with filament life.

These lamps, in general, are large and cumbersome and require frequent adjustments and replacement because of burned out filaments. In addition, these lamps preclude efforts to miniaturize such equipment and also pose a potential danger to operators and to the equipment itself because of the heat generated during their operation. The wavelengths produced may vary as a function of time with the aging of the lamps, and because the process involves Ar or halogen gases that have to be "ignited" in order to produce radiation, it is not possible to modulate these lamps at rates faster than what a mechanical shutter would provide.

With respect to xenon sources, although there is a high ratio of usable radiant energy with respect to power and heat generated, the measurement of that power is limited to a short time. High voltages and sudden surges of high current generate electrical noise that often interferes with other electronic subsystems.

SUMMARY OF THE INVENTION

A method of optically testing a sample of a biological fluid which is used in clinical diagnostics comprising the steps of:
a) providing a radiation upconversion phosphor layer or crystal exhibiting upconversion radiation when excited by visible or infrared irradiation from an independent source;
b) exciting the layer or crystal to provide a source of light; and
c) projecting such excited light onto a sample containing a biological fluid, in the presence of a chemically interactive material that produces a quantitative, detectable and measurable change.

In this invention, a radiation source is used which is particularly suitable for interrogating test samples having a biological fluid deposited thereon.

Advantages

Upconversion sources used in a method of this invention are:
1) solid state, rugged, have no moving parts and are not susceptible to performance variations with aging, as in the case of filaments;
2) compact and small in size thereby providing the necessary space for all components;
3) stable structures and position of radiation source that does not vary from radiation pulse to pulse;
4) the excitation source uses low voltages and currents compared to flash lamp systems leading to low electronic interference and power surges; and
5) changes in the identity of the dopants in the upconversion crystal and/or changes in the excitation wavelength lead to different output wavelengths without having to switch to new sources. Several different upconversion materials can share the same excitation source leading to multiple combinations of wavelengths.

The upconversion process does not generate heat since solid state sources are efficient in power consumption versus usable light intensity.

The output spectrum of the upconversion process is stable with time and relatively stable within the temperature range of operation of the diagnostic equipment.

Excitation sources (laser diode, light emitting diode) have relatively high stability of output versus time leading to relatively high stability to the upconversion output radiation.

The upconversion response of the upconversion crystal is fast enough to be modulated by means of modulation of the excitation source. This enables synchronous demodulation of the detected light. This provides advantages over continuous sources which require the addition of mechanical choppers or on/off operation of the flash lamp system in order to achieve radiation pulses of the adequate duration and rate of repetition.

DESCRIPTION OF THE PREFERRED EMBODIMENTS

The drawings illustrate various embodiments of the invention. It will be recognized by one skilled in the art that a multiplicity of optical systems may be added to collimate, focus, direct, and separate the output radiation. It will be recognized by one skilled in the art that the substrates may be of irregular shapes such that the interaction with the irradiation source would be optimized and that upconversion would also be optimized and to fit an specific application. It will be recognized by one skilled in the art that the excitation radiation can be focused, or otherwise directed into the upconversion material directly, across the substrate, or end-couple in the case of waveguides and by a multiplicity of means as the specific application demands. It will be recognized by one skilled in the art that the substrate containing the upconversion material or the free-standing crystalline material can be coated with antireflection coatings to optimize specific absorption from the excitation source or other coatings to filter off specific output emissions in a manner dictated by the application. It will be understood by one skilled in the art that the output of an infrared light source can conveniently be coupled to the irradiation source by a optical delivery arrangement such as a fiber optic.

Figure 1:
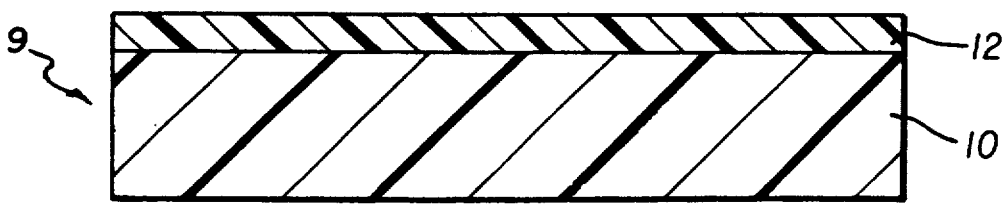
FIG. 1 shows in cross section an upconversion device or source for converting infrared radiation and visible light into visible and UV radiation.
Figure 2:
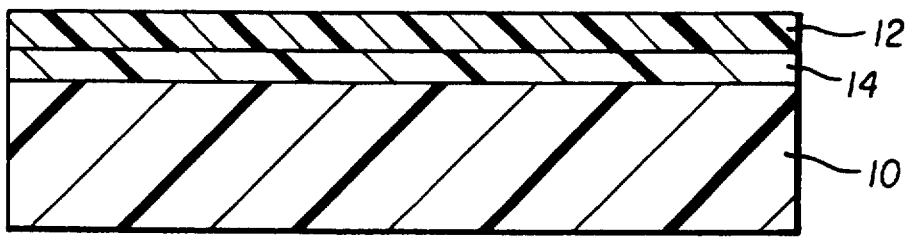
FIG. 2 shows a structure similar to FIG. 1 but including an interfacial buffer layer.
Figure 3:
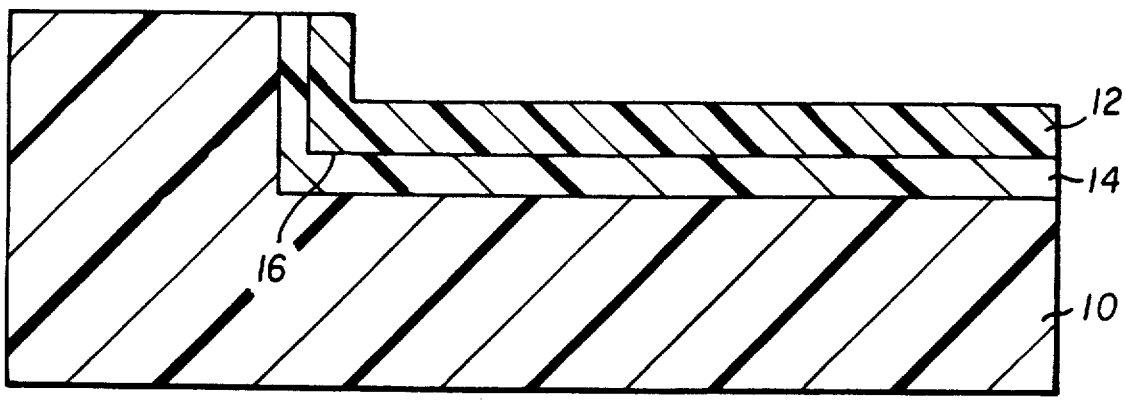
FIG. 3 shows another device for converting infrared radiation and visible light into visible and UV radiation.
Figure 4:
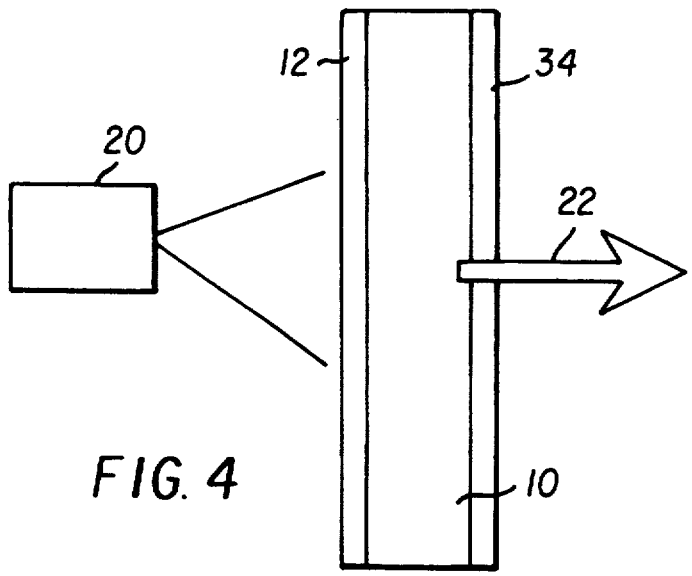
FIG. 4 shows an upconversion system having a device with a color filter coating and a source of radiation.
Figure 5:
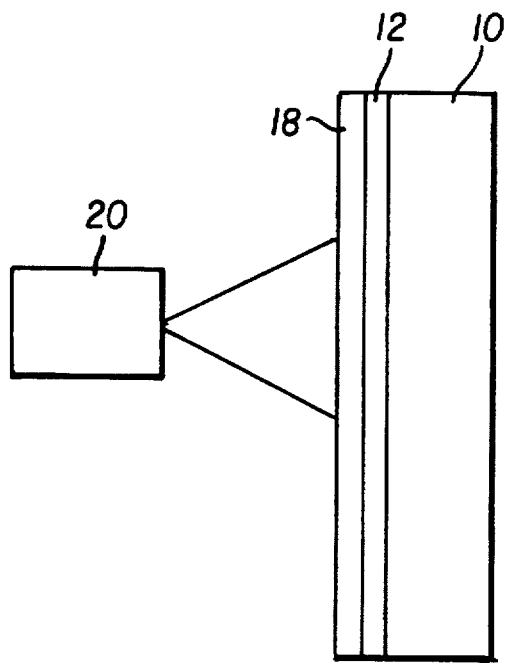
FIG. 5 shows an arrangement similar to FIG. 4 but which includes an antireflective coating on the device.

FIG. 1 illustrates an upconversion device which includes a substrate 10 coated by a thin film or thick layer 12 of upconversion material. FIG. 2 shows a substrate 10 coated by an interfacial layer 14 and a thin film or thick coating 12 of upconversion material. The interfacial layer can, for example, be made of silicon dioxide. FIG. 3 illustrates a substrate 10 with a microfabricated feature 16, coated by an interfacial layer 14, and a thin film or thick layer of upconversion material 12. FIG. 4 an upconversion device having a substrate 10 coated by a thin film or thick layer 12 of upconversion material optically coupled to an irradiation source 20, such as a laser with a preferred wavelength of 650 nm or 960 nm and a color filter 34 to select specific wavelengths to be emitted as radiation 22 as shown by an arrow from the device. FIG. 5 shows a device having a substrate 10 coated by a thin film or thick layer 12 of upconversion material, and also coated by an antireflection coating 18 to ensure that the majority of the exciting irradiation is transmitted and interacts with the upconversion material 12.

The upconversion material can be an amorphous or crystalline phosphor thin film in a family upconversion phosphors of the following composition:

$$\boxed{Ba-Ln-F}$$

where Ln may be Y, Yb, Ho, Er, Tm or a combination thereof. One of the advantages of these family of phosphors over heavy metal fluoride phosphors is that the vapor pressures for the constituent fluorides can be closely matched, making them ideal for thermal deposition and electron-beam (e-beam) deposition to form thin films.

The film is, of course, irradiated by light, preferably from a laser and such light can be modulated by an modulator to produce pulses of irradiation. For a more complete description, see the above-identified U.S. application Ser. No. 186,400 to Gustavo Paz-Pujalt et al.

Figure 6:
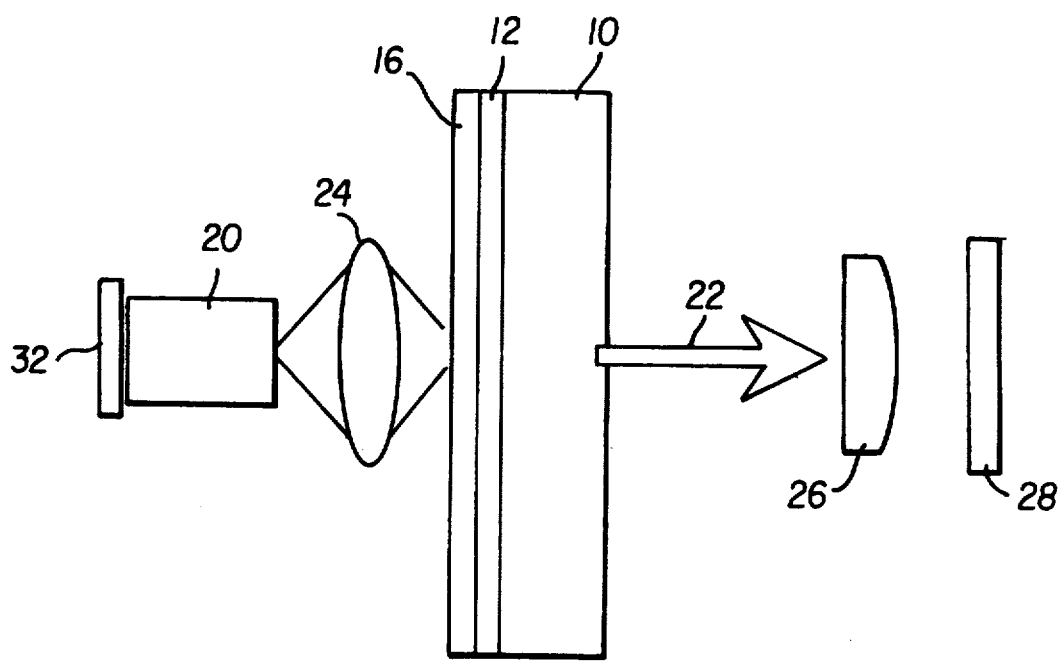
FIG. 6 shows a system which uses the arrangement of FIG. 5 but further includes optics and modulation source for the laser.

FIG. 6 illustrates a system which incorporated a device such as shown in FIG. 2. A irradiation source 20 is modulated by an external or internal modulator 32 to produce pulses of irradiation that are focused onto a layer of antireflective coating 16 coated onto a thin film or thick layer of upconversion material 12 on a substrate 10; and where the output upconverted radiation 22 is collimated by a lens 26 onto a filter 28 that selects specific wavelengths.

Figure 7:
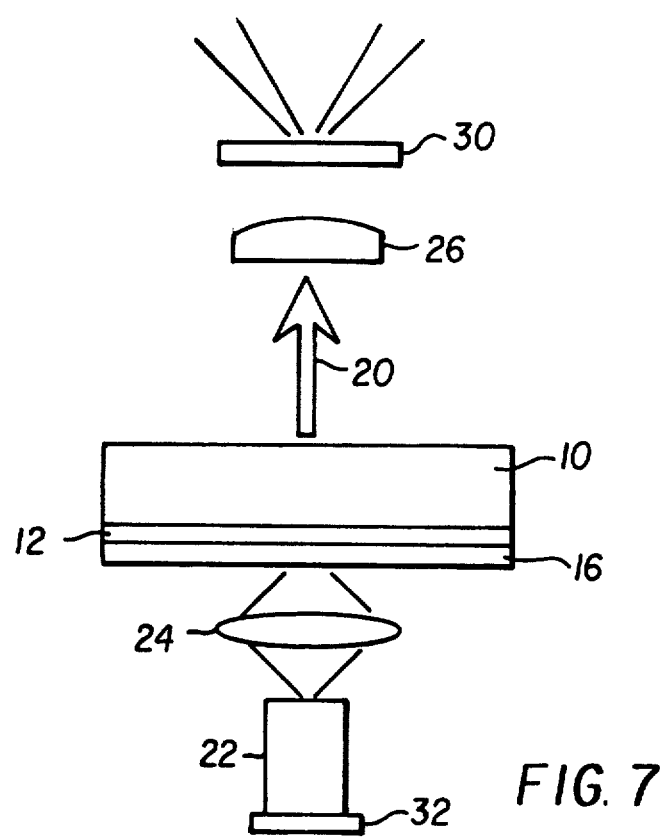
FIG. 7 is another system similar to FIG. 6 but further including grating for separating radiation from the device into various wavelengths or colors.

FIG. 7 describes yet another schematic system including an irradiation source 22 and modulator combination 32 producing modulated irradiation that is focused by means of a lens 24 onto an antireflection coating 16 coated onto a thin film or thick layer of upconversion material 12 coated on a substrate 10 The upconverted light emitted by the device is shown by arrow 20. Such light is directed by a lens 26 onto a grating 30 where the upconverted radiation is separated according to wavelengths by the grating 30 for further use.

Figure 8:
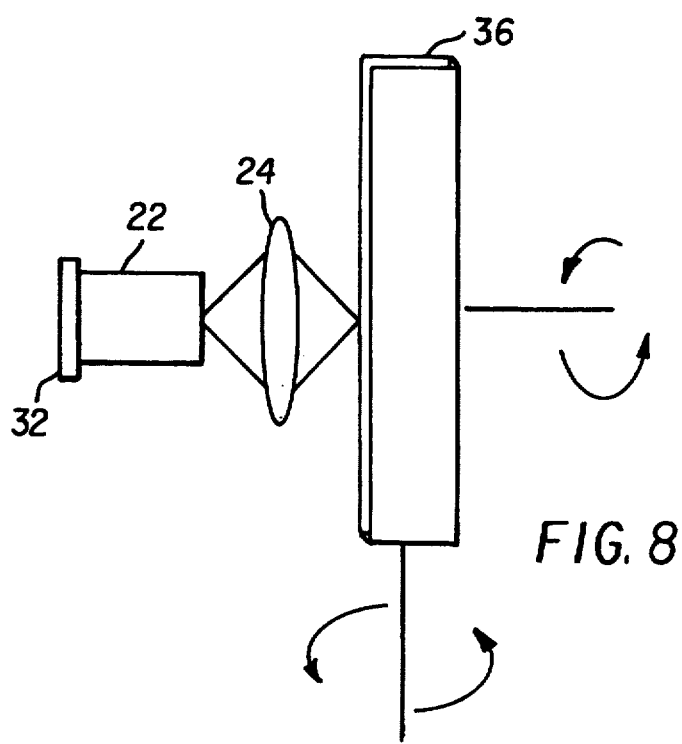
FIG. 8 shows a device similar to FIG. 5 wherein the upconversion device includes a crystal.

FIG. 8 shows an upconversion device having a crystal 36 made of an upconversion phosphor that can be mounted on rotation axis so that the excitation irradiation can be directed into any given crystallographic direction of the crystal.

Figure 9:
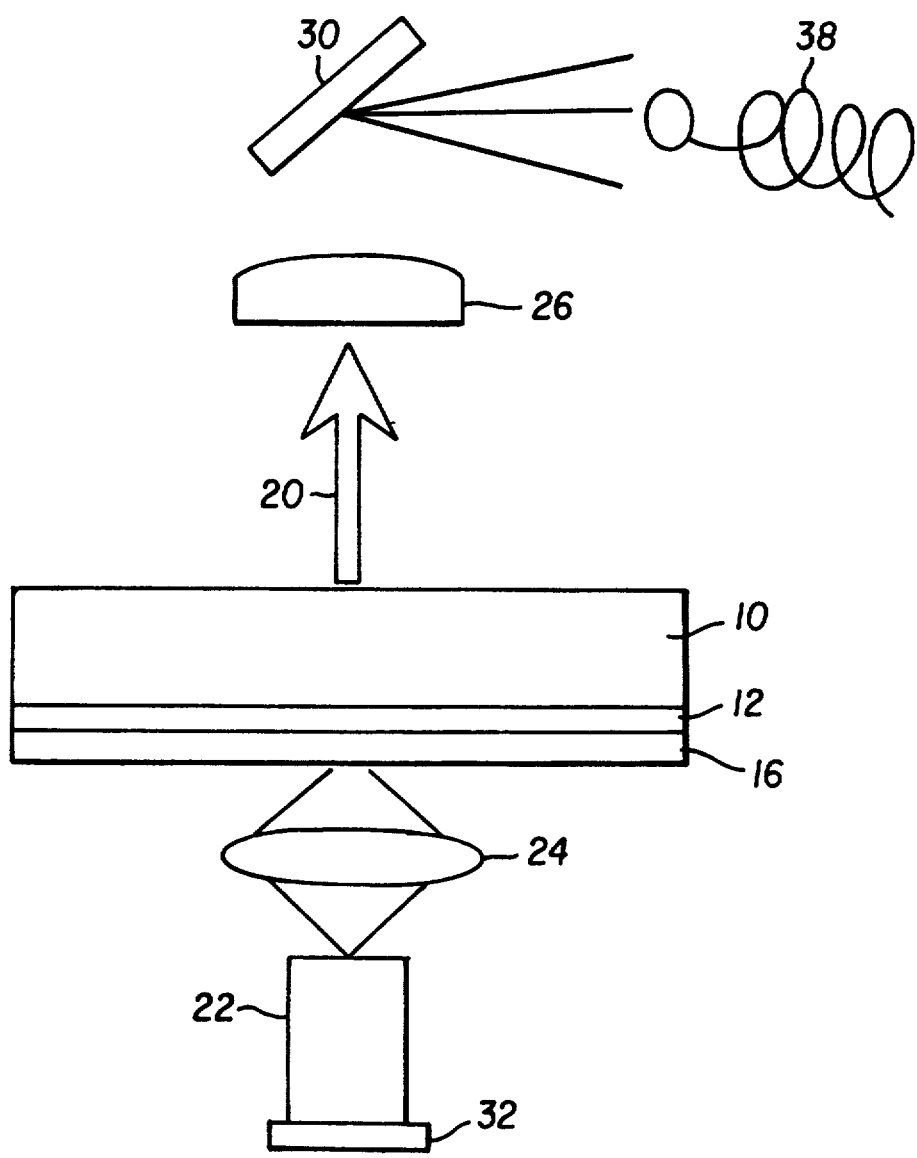
FIG. 9 discloses a system similar to FIG. 6 with a fiber optics being coupled to the output of the system.

FIG. 9 shows yet another schematic system comprising an irradiation source 22 and modulator combination 32 producing modulated irradiation that is focused by means of a lens 24 onto an antireflection coating 16 coated onto a thin film or thick layer of upconversion material 12 coated on a substrate 10 whereby upconverted emission 20 is focused by a lens 26 onto a grating 30 where the upconverted radiation is separated according to wavelengths by the grating 30 and directed by an optical coupler and fiber optics 38 combination for further use.

It will be understood by those skilled in the art that the above described arrangements are suitable for use for interrogating test samples having a biological fluid. For example, the test sample can be placed in a holder and light emitted by an upconversion phosphor or crystal illuminates the sample and can reflect or be transmitted through the sample onto a detector. Alternatively, light can pass through an optical structure and be reflected off of the sample and refracted by the optical structure onto the appropriate detectors.

Figure 10:
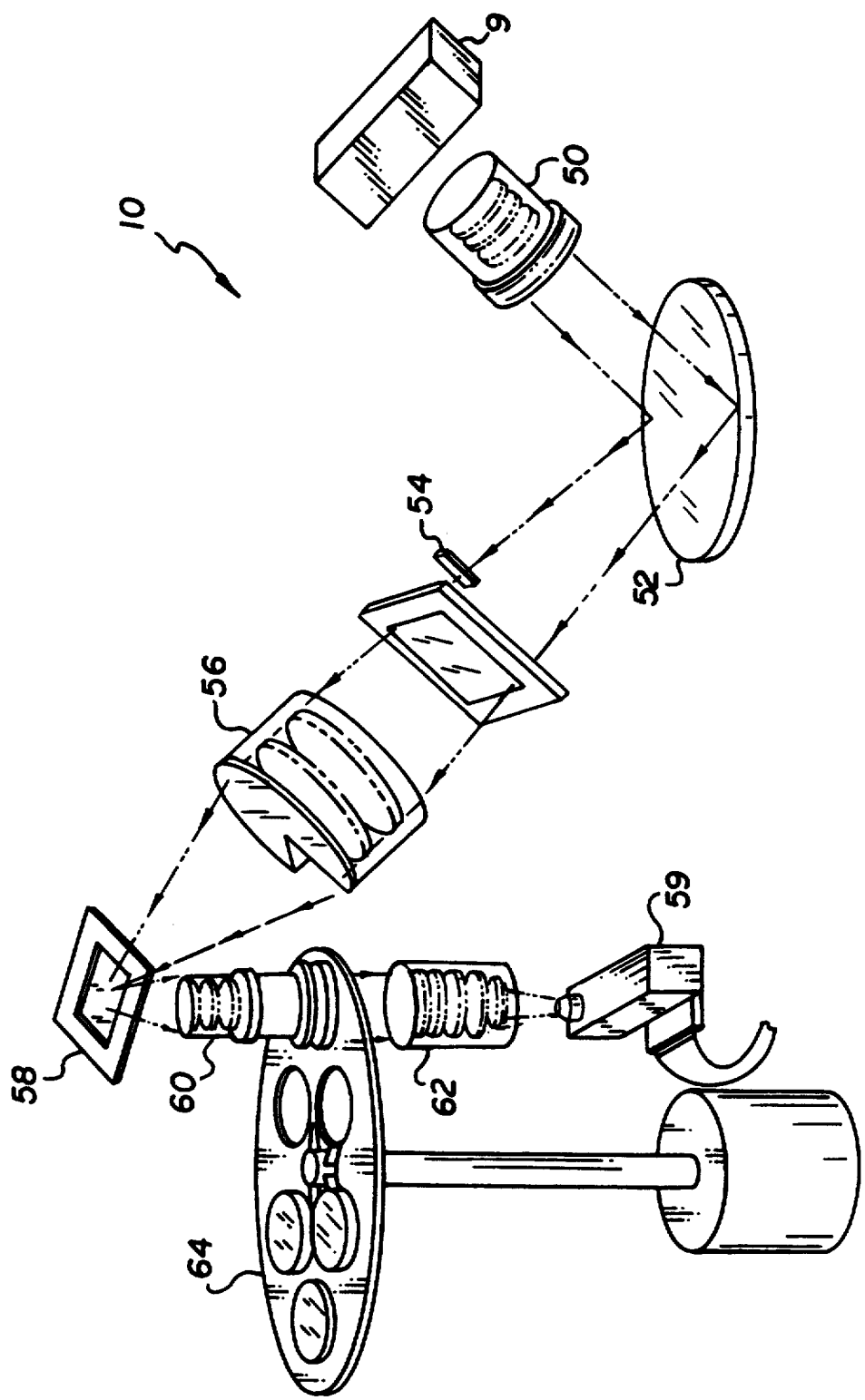
FIG. 10 shows a schematic of a typical system for using an upconversion light source in accordance with the method of this invention.

As shown in FIG. 10, light produced by an upconversion device provided in any one of the systems discussed above is passed through an infrared filter 50 and is reflected off of a second (cold) mirror 52 which absorbs infrared radiation and then is directed through an aperture arrangement 54 onto a series of lenses 56 where light is focused onto a sample deposited on a slide 58. The sample includes a liquid that has an active biological fluid and a chemically interactive material. See the discussion in the background of the invention. Tests can be performed as set forth in U.S. Pat. No. 3,992,158, Nov. 16, 1976, the disclosure of which is incorporated herein by reference. As disclosed a clinical chemistry slide can include a multilayered analytical element coated on a clear polymeric support held in a slide mount. The top layer is an isotropically porous spreading layer which evenly distributes the fluid to be analyzed into the underlaying reagent layers, that may perform multiple functions in an integrated manner. Light which is reflected off of the slide through the biological fluid passes through a collimated lens assembly 60 and then a relay lens assembly 62 where it is focused onto a photodetector 59. Intermediate between the collimated lens assembly 60 and the relay lens assembly 62 there is provided a filter wheel 64 through which appropriate filters can be placed into the optical path of the light between the collimated lens assembly 60 and the relay lens assembly 62. The filters are used to select the spectrum of light to be monitored by a photodetector 59.

It will be understood by those skilled in the art that the sample containing the biological fluid also contains a chemically active material, that can be activated in the presence of such material to produce a quantitative and detectable change which can be the generation or destruction of coloration or fluorescence.

EXAMPLE 1

A mixture of $BaF_2$, $YF_3$, $YbF_3$ and $TmF_3$ powders were weighed and mixed in the molar proportions of 1:1:.99:.01. After mechanical mixing the resulting mixture was used for depositing thin films by electron beam evaporation onto fused silica substrates. A film thickness of 1.0 $\mu m$ was obtained. The film was deposited with ion assisted deposition. The resulting film was amorphous to x-ray diffraction measurements. When irradiated by 647 nm visible light the film produced visible and UV radiation. The produced radiation had the following composition: 350–370 nm (UV); 440–480 nm (blue); and 500–550 nm (green).

EXAMPLE 2

A mixture of $BaF_2$, $YF_3$, $YbF_3$, $ErF_3$ and $TmF_3$ powders were weighed and mixed in the molar proportions of 1:1:0.99:0.005:0.005. After mechanical mixing the resulting mixture was used for depositing thin films by thermal evaporation onto fused silica substrates and $BaF_2$ wafers cut along the (100) direction. A film thickness of 1 $\mu m$ was obtained when the deposition lasted for 2 hours and the substrate temperature was 240° C. The resulting film was amorphous (glassy) to x-ray diffraction measurements. When irradiated by 960 nm IR radiation the film produced UV and visible radiation. The produced radiation had the following composition: 350–370 nm (UV); 440–480 nm (blue); 500–550 nm (green); and 630–680 nm (red).

EXAMPLE 3

A mixture of $BaF_2$, $YF_3$, $YbF_3$ and $TmF_3$ powders were weighed and mixed in the molar proportions of 1:1:0.99:0.01. After mechanical mixing the resulting mixture was used for depositing thin films by thermal evaporation as described above. A silicon (100) substrate was coated by thermal evaporation with a thin layer of approximately 0.25 $\mu m$ of $SiO_2$ (n=1.456). Onto this coated substrate was coated a ~2 $\mu m$ layer of the mixture described above. The substrate was maintained at a temperature of 240° C. The resulting fluoride thin film was amorphous to x-rays.

EXAMPLE 4

A mixture of $BaF_2$, $YF_3$, $YbF_3$ and $TmF_3$ powders were weighed and mixed in the molar proportions of 1:1:0.99:0.01. After mechanical mixing the resulting mixture was used for depositing thin films by thermal evaporation as described above. A gallium arsenide (III-V-type) compound semiconductor substrate with microfabricated features (FIG. 3) was coated by thermal evaporation with a thin layer of approximately 0.25 $\mu m$ of $SiO_2$ (n=1.456). Onto this coated substrate was coated a ~2 $\mu m$ layer of the mixture described above. The substrate was maintained at a temperature of 240° C. The resulting fluoride thin film was amorphous to x-ray diffraction. Scanning electron micrographs showed a conformal relationship between the interfacial film, the substrate and the fluoride thin film. The produced radiation had the following composition: 340–370 nm (UV); 440–480 nm (blue); 500–550 nm (green); and 630–680 nm (red).

EXAMPLE 5

A mixture of $BaF_2$, $YF_3$, $YbF_3$, $ErF_3$ and $TmF_3$ powders were weighed and mixed in the molar proportions of 1:1:0.99:0,005:0.005. After mechanical mixing the resulting mixture was used for depositing thin films by thermal evaporation onto a $BaF_2$ wafer oriented in the (100) direction. A film thickness of 1 $\mu m$ was obtained when the deposition lasted for 2 hours and the substrate temperature was 240° C. The resulting film was amorphous to x-ray diffraction measurements. After rapid thermal annealing treatment at 900° C. for 20 sec. x-ray diffraction revealed a film highly oriented in the a-crystallographic direction. When irradiated by 960 nm IR radiation, the film produced UV and visible radiation. The produced radiation had the following composition: 340–370 nm (UV); 440–480 nm (blue); 500–550 nm (green); and 630–680 nm (red).

EXAMPLE 6

Free-standing crystal of upconversion phosphor material with composition $BaYYbF_8$:1% Tm were used. When irradiated by 960 nm IR radiation, the crystal produced UV and visible radiation. The produced radiation had the following composition 340–370 nm (UV), 440–480 nm (blue), 500–550 nm (green), and 630–680 nm (red) visible light. Rotations of the crystal about an axis produced enhanced emissions of specific wavelengths. Changes in the polarization of the excitation irradiation also produced enhanced emissions of given wavelengths. The upconversion crystals were coated with antireflection coatings and with color filtering coatings.

EXAMPLE 7

A powder of upconversion phosphor material with composition BaYYbF$_8$:1% Tm was mixed with index matched ultraviolet cured Norland Optical Adhesive ™ into a fine paste and coated onto a pyrex glass slide as a thick layer of approximately 1 mm. When irradiated by 960 nm IR radiation, the thick layer produced UV and visible radiation. The produced radiation had the following composition: 340–370 nm (UV); 440–480 nm (blue); 500–550 nm (green); and 630–680 nm (red).

The upconversion phosphor device may be a slab or fiber or thin film of ZBLAN or AYF or AZF upconversion glass optically coupled to a source of irradiation that impinges.

An upconversion phosphor thin film, thick layer, crystal or glass sample may be optically coupled to an irradiation source that is modulated by electronic switching resulting in modulated excitation irradiation input into the upconversion phosphor whereby the upconverted output is also modulated.

An upconversion phosphor thin film, thick layer, crystal or glass sample may be optically coupled to an irradiation source that is modulated by mechanical chopping resulting in modulated excitation irradiation input into the upconversion phosphor whereby the upconverted output is also modulated.

The output of an upconversion phosphor thin film, thick layer, crystal or glass sample may be coupled to a diffraction grating or a cutoff filter or other means of separating or excluding one or more of the upconverted radiation and directed by means of lenses or fiber optics or other means for further use.

When only blue light is required for a specific application, the light source may be a light emitting diode (LED) like gallium nitride-type (GAN) or silicon carbide-type (SIC), both of which produce light in the blue region of the spectrum.

The invention has been described in detail with particular reference to certain preferred embodiments thereof, but it will be understood that variations and modifications can be effected within the spirit and scope of the invention.

PARTS LIST 9 upconversion device
10 substrate
12 thin film or thick layer coating of upconversion material
14 buffer layer
16 microfabricated feature
18 antireflection coating
20 RGB-UV output
22 LED or diode laser
24 focusing lens
26 collimating lens
28 filter
30 grating
32 modulator
34 color filter coating
36 upconversion phosphor crystal
38 optical coupler-fiber optic combination
40 polymeric substrate and test sample holder
42 test sample
44 detector
50 infrared filter
52 second mirror
54 aperture
56 eyepiece lens assembly
58 slide
59 photodetector
60 collimated lens assembly
62 relay lens assembly
64 filter wheel

We claim:
1. A method of optically testing a sample of a biological fluid which is used in clinical diagnostics comprising the steps of:
   a) providing a radiation upconversion phosphor layer or crystal exhibiting upconversion radiation when excited by visible or infrared irradiation from an independent source;
   b) exciting the layer or crystal to provide a source of light; and
   c) projecting such excited light onto a sample containing a biological fluid, in the presence of a chemically interactive material that produces a quantitative, detectable and measurable change.

2. The method as in claim 1 where the upconversion phosphor can be coated with an antireflection coating to maximize the absorption of the excitation radiation.

3. The method as in claim 2 wherein the light source can be modulated in the Kilohertz frequency range by means of modulating the light emitting diode or the diode laser IR irradiation sources by a plurality of means like switching, chopping, and deflecting.

4. The method as in claim 1 where the produced radiation can be filtered in order to remove specific wavelengths or can be passed through a refractive grating or filter where wavelengths are selected so that the desired wavelength(s) can be directed to the test element for sample interrogation.

5. The method as in claim 1, wherein the radiation source include a gallium nitride-type (GAN) or a silicon carbide-type (SIC) light emitting diode wherein the upconversion phosphor is selected from a mixed metal fluoride comprising alkaline fluorides, alkaline earth fluorides, and lanthanide fluorides.

* * * * *